United States Patent [19]

Ishihara et al.

[11] Patent Number: 5,588,589
[45] Date of Patent: Dec. 31, 1996

[54] AIR CONDITIONER

[75] Inventors: Manabu Ishihara; Tsuyoshi Rakuma, both of Gunma-ken; Hiroshi Kanai, Saitama-ken; Takashi Fudo; Masato Watanabe, both of Gunma-ken, all of Japan

[73] Assignee: Sanyo Electric Co., Ltd., Osaka, Japan

[21] Appl. No.: 447,068

[22] Filed: May 22, 1995

[30] Foreign Application Priority Data

Aug. 19, 1994 [JP] Japan ..................... 6-195781

[51] Int. Cl.⁶ ................................. G05D 23/00
[52] U.S. Cl. ..................... 236/46 R; 62/231; 62/228.4; 165/267
[58] Field of Search ............... 236/46 R, 46 F, 236/47, 91 R; 62/228.4, 157, 231, 158, 228.5; 165/12, 14, 26

[56] References Cited

U.S. PATENT DOCUMENTS

| | | | |
|---|---|---|---|
| 4,341,345 | 7/1982 | Hammer et al. | 236/46 R |
| 4,495,560 | 1/1985 | Sugimoto et al. | 62/231 X |
| 4,978,061 | 12/1990 | Ogihara et al. | 236/49.3 |
| 5,190,096 | 3/1993 | Taniguchi et al. | 236/46 R X |

Primary Examiner—Harry B. Tanner
Attorney, Agent, or Firm—Darby & Darby, P.C.

[57] ABSTRACT

An air conditioner for reduction of energy consumption without impairing the comfortable feeling, which comprises a room temperature detector for detecting the room temperature of an air-conditioned room, temperature setting apparatus for setting a target temperature, air conditioning device for performing an air conditioning operation to bring the room temperature detected by the room temperature detector toward the target temperature, and target temperature charger, which corrects the target temperature to rise and fall periodically in accordance with a predetermined rule after the room temperature has substantially reached the target temperature through use of the air conditioning devices. The charger shifts the average value of the target temperature after the start of the correction in such a direction that the air conditioning load of the air conditioning device is reduced from that for attaining the target temperature before the correction.

9 Claims, 8 Drawing Sheets

AIR CONDITIONER

BACKGROUND OF THE INVENTION

The present invention relates to an air conditioner and, more particularly, to an air conditioner controlling the room temperature on the basis of a set temperature.

There have been known air conditioners having a pair of heat exchangers which are provided outdoors and indoors, respectively, for performing a process of heat exchange using a refrigerant, a compressor for compressing the refrigerant, a four-way valve for changing the direction in which the refrigerant flows, a capillary tube, and so on, and performing air conditioning in various operational modes such as heating, cooling, and dehumidifying modes by changing the direction of the four-way valve or the like.

Such an air conditioner is provided with a temperature sensor for detecting the room temperature and it, in cooling or heating, achieves the effect of air conditioning generally by causing the room temperature to agree with a preset target temperature. Recently, such a type of air conditioner, a so-called inverter type air conditioner, has also become popular, in which the operating frequency of the compressor is made changeable by an inverter such that the operating frequency, hence the operating capacity, of the compressor is changed according to a change in the air conditioning load and, thereby, the room temperature is accurately controlled with respect to the set temperature.

However, it is known as a characteristic of the senses of human beings that when a person is placed in constant environmental conditions (constant air temperature, humidity, air draft, etc.) for a long time, he or she becomes used to the environment and, as a result, the person, even if he felt comfortable at the beginning of his being placed in the environment, gradually comes to feel less comfortable. Consequently, even after the room temperature has reached the level of the preset target temperature through the operation of the air conditioner, a person who has stayed in the room over a certain length of time and, hence, become used to the environmental conditions, may change the target temperature to have a more comfortable feeling. As a result, there has frequently been wasteful consumption of energy.

SUMMARY OF THE INVENTION

Accordingly, it is an object of the present invention to provide an air conditioner capable of reducing energy consumption without lessening the comfortable feeling of the person in the room.

In order to attain the above object, an air conditioner is characterized in that it comprises a room temperature detection means for detecting the room temperature of an air-conditioned room, a temperature setting means for setting a target temperature, an air conditioning means for performing an air conditioning operation to bring the room temperature detected by the room temperature detection means toward the target temperature, and a target temperature changing means, in which the target temperature changing means corrects the target temperature to rise and fall periodically in accordance with a predetermined rule after the room temperature has substantially reached the target temperature by air conditioning operation of the air conditioning means and shifts the average value of the target temperature after the correction in such a direction that the air conditioning load of the air conditioning means is thereby lightened from that for attaining the target temperature before correction.

An air conditioner according to the invention is also characterized in that the target temperature changing means starts the correction of the target temperature when the period of time during which the room temperature stays within a predetermined temperature range, including the target temperature, is about to exceed a predetermined length of time.

An air conditioner of the present invention is further characterized in that it comprises a room temperature detection means for detecting the room temperature of an air-conditioned room, a temperature setting means for setting a target temperature, an air conditioning means for performing an air conditioning operation to bring the room temperature detected by the room temperature detection means toward the target temperature, and a target temperature changing means, in which the target temperature changing means corrects the target temperature to rise and fall periodically in accordance with 1/f fluctuations when a predetermined length of time has elapsed after the room temperature reached or substantially reached the target temperature, and shifts the average value of the target temperature after the start of the correction in the direction such that the air conditioning load of the air conditioning means is lightened from that for attaining the target temperature before the correction.

According to the air conditioner of the invention, the air conditioning means performs air conditioning so that the room temperature detected by the room temperature detection means may be brought toward the target temperature set by the temperature setting means.

After the room temperature has been brought substantially to the target temperature through the air conditioning operation of the air conditioning means as described above, the target temperature changing means corrects the target temperature to rise and fall periodically in accordance with a predetermined rule and shifts the average value of the target temperature after the start of the correction in such a direction that the air conditioning load of the air conditioning means is thereby lightened from that for attaining the target temperature before the correction.

Thus, the target temperature is corrected to rise and fall periodically in accordance with the predetermined rule and the average value of the target temperature after the correction is shifted in such a direction that the air conditioning load of the air conditioning means is thereby lightened from that for attaining the target temperature before the correction and, thus, energy consumed by the air conditioning means can be reduced.

While the air conditioner according to the invention can be any of an air conditioner equipped with both cooling and heating functions, an air conditioner equipped with only cooling function, and an air conditioner equipped with only heating function, the above "shifting in such a direction that the air conditioning load of the air conditioning means is thereby lightened from that for attaining the target temperature before the correction" means shifting the target temperature toward higher temperature than the target temperature before the correction, in the case of cooling operation, and shifting the target temperature toward lower temperature than the target temperature before the correction, in the case of heating operation.

With the target temperature corrected in the described manner, the room temperature varies up and down periodically in accordance with a predetermined rule and the average value of the room temperature takes on a value shifted in such a direction that the load of the air conditioning means is thereby lightened from that for attaining the target temperature before the correction.

Since the room temperature periodically varies up and down in the described manner, the person in the room hardly feels that the environmental conditions inside the room are constant and, hence, his or her comfortable feeling does not gradually lessened by their becoming used to the environmental conditions.

Therefore, the person in the rarely has a desire to have a more comfortable feeling, for example, change the target temperature to increase the load on the air conditioning means from that for attaining the originally set target temperature (to lower the temperature from the originally set temperature in the cooling or to raise the temperature from the originally set temperature in the heating) and, hence, thus preventing the consumed energy from increasing. Thus, energy consumption can be saved without impairing the comfortable feeling.

The target temperature changing means starts the correction of the target temperature when the period of time during which the room temperature is within a predetermined temperature range from the target temperature is about to exceed a predetermined period of time.

Through such practice, the human senses, in the period before the room temperature becomes stabilized around the target temperature, are not yet used to the environmental conditions in the room, and hence a comfortable feeling can be provided by bringing the room temperature to the vicinity of the desired temperature (target temperature). But when the room temperature has been within a predetermined temperature range from the target temperature over a predetermined period of time, i.e., when the room temperature has become stabilized around the target temperature, the target temperature changing means shifts the average value of the target temperature in such a direction that the air conditioning load of the air conditioning means is lightened from that for attaining the target temperature before the correction and the air conditioning means performs the air conditioning operation to bring the room temperature toward the target temperature. Accordingly, the senses of the person in the room are prevented from becoming used to the environmental conditions in the room so that his or her comfortable feeling is not lessened but can be maintained.

Therefore, fine room temperature control maintaining the comfortable feeling according to changes in the senses of the person in the room can be realized.

Further, according to the air conditioner of the invention, the air conditioning means performs air conditioning so that the room temperature detected by the room temperature detection means may be brought toward the target temperature set by the temperature setting means.

After a predetermined period of time has elapsed since the room temperature reached the target temperature or substantially reached the target temperature through the air conditioning operation made of the air conditioning means as described above, the target temperature changing means corrects the target temperature to rise and fall periodically in accordance with 1/f fluctuations and shifts the average value of the target temperature after the start of the correction in such a direction that the air conditioning load of the air conditioning means is thereby lightened from that for attaining the target temperature before the correction.

Thus, the target temperature is corrected to rise and fall periodically in accordance with the 1/f fluctuation and the average value of the target temperature after the correction is shifted in such a direction that the air conditioning load of the air conditioning means is thereby lightened from that for attaining the target temperature before the correction.

Incidentally, the 1/f fluctuation is, for example, related with the number of human pulses and it is said to provide special comfortable feeling to human being.

Since the room temperature periodically varies up and down in accordance with the 1/f fluctuation, the person in the room does not feel that the environmental conditions in the room are constant and, hence, the comfortable feeling is prevented from becoming gradually lessened, but instead the person in the room is given a special comfortable feeling.

Therefore, it is unnecessary for the person in the room, from a desire to have a more comfortable feeling, for example, to change the target temperature on the side of increasing the load of the air conditioning means from that for attaining the originally set target temperature (to lower the temperature from the originally set temperature in the cooling mode or to raise the temperature from the originally set temperature in the heating) to invite an increase in consumed energy. Thus, energy consumption can be saved without impairing the comfortable feeling.

DETAILED DESCRIPTION OF THE PREFERRED EMBODIMENT

An embodiment of the invention will be described in detail with reference to the accompanying drawings. While numeric values not affecting the invention are used in the following description, the invention is not limited by any of such numeric values.

Figure 1:
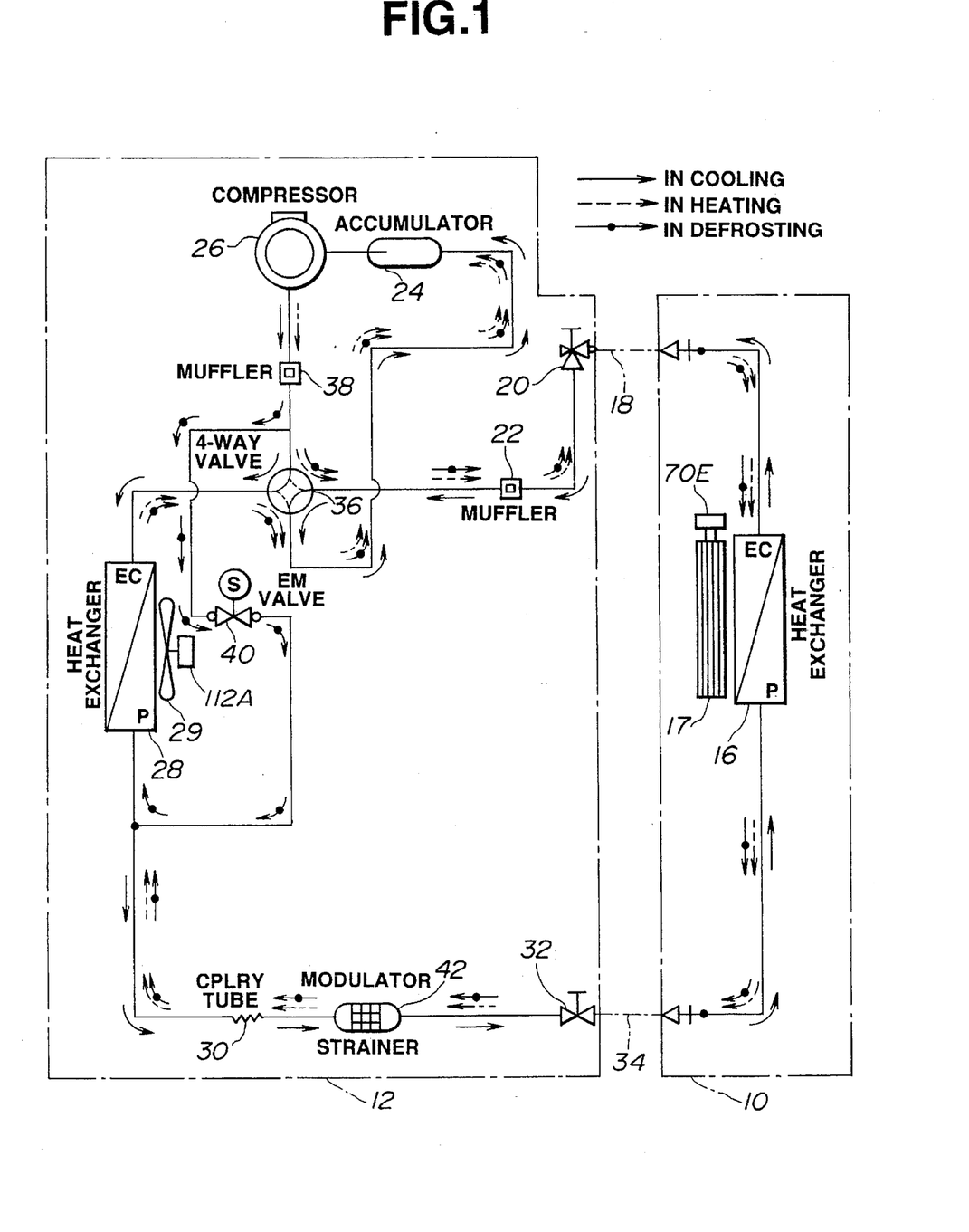
FIG. 1 is a refrigerant circuit diagram of an air conditioner according to an embodiment of the invention.

The air conditioner according to the embodiment has, as shown in FIG. 1, an indoor unit 10 and an outdoor unit 12 and, further, has a refrigerant circulating path for circulating the refrigerant through the indoor unit 10 and the outdoor unit 12.

The indoor unit 10 is provided with an indoor heat exchanger 16. In the vicinity of the indoor heat exchanger 16, there is provided a fan 17 driven by a fan motor 70E, described later. The fan 17 creates air flow through the indoor heat exchanger 16.

The indoor heat exchanger 16 is connected with a valve 20 of the outdoor unit 12 by a refrigerant tube 18 formed of a thick pipe. Further, the valve 20 is connected with a four-way valve 36 by a muffler 22. The four-way valve 36 is joined to the outdoor heat exchanger 28. Also a refrigerant loop is established from valve 36 through an accumulator 24, a compressor 26, a muffler 38, and back to the four-way valve 36.

The outdoor heat exchanger 28 is joined to a valve 32 through a capillary tube 30 and a strainer 42, and is also joined to the junction point between the muffler 38 and the four-way valve 36 through an electromagnetic valve 40. The valve 32 is also connected with the indoor heat exchanger 16 by a refrigerant pipe 34 formed of a thin tube, which establishes a closed refrigerant circulating path, i.e., a refrigerating cycle, is formed.

In the vicinity of the outdoor heat exchanger 28, there is provided a fan 29 driven by a fan motor 112A. The fan 29 creates an air flow through the outdoor heat exchanger 28.

Figure 2:
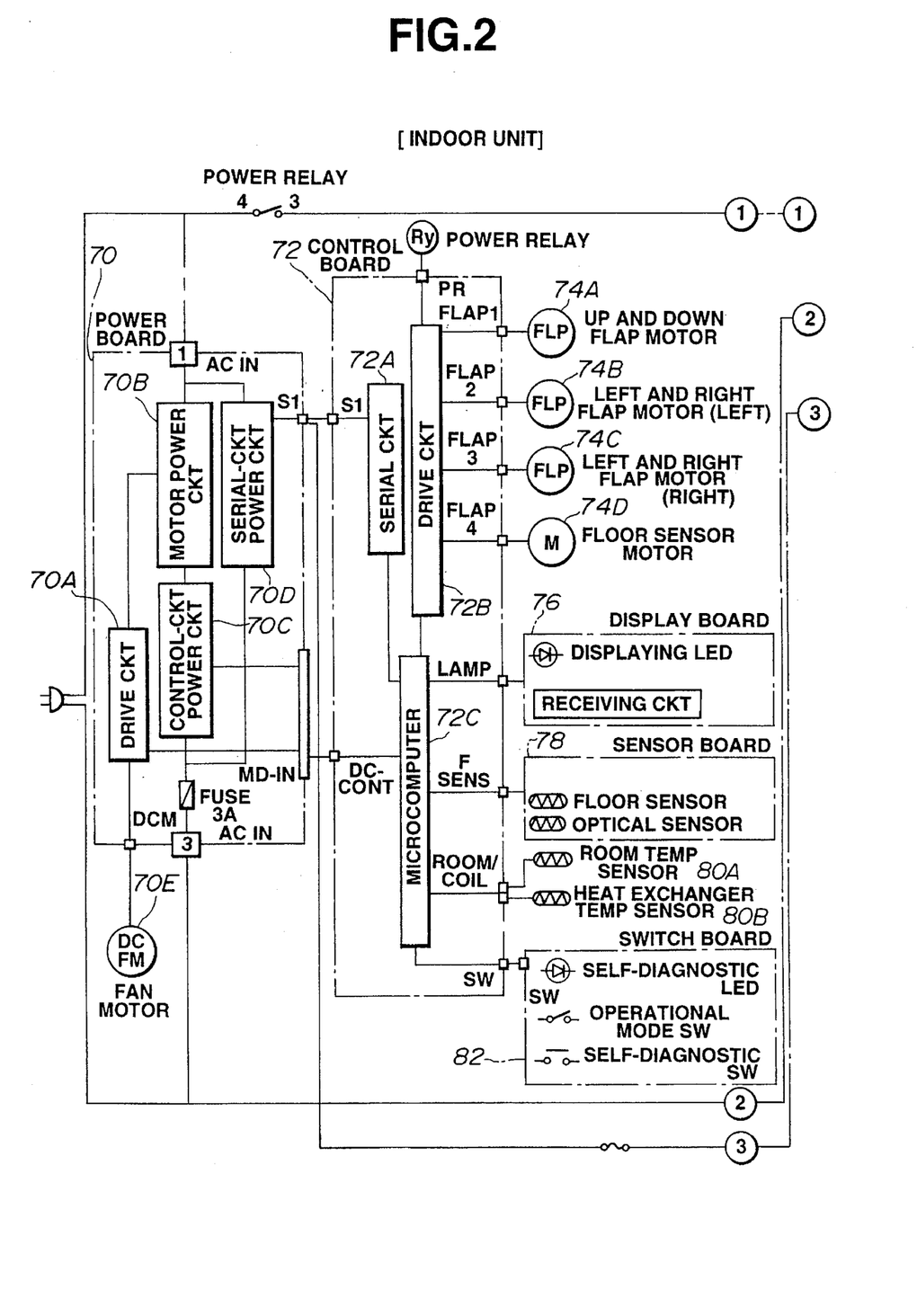
FIG. 2 is an electric circuit diagram of the indoor unit of the air conditioner.

FIG. 2 is a diagram showing an electric circuit for the indoor unit 10. The electric circuit has a power board 70 and a control board 72. On the power board 70, there are provided a drive circuit 70A to which fan motor 70E (DC brushless motor) for controlling the air sent into the room is connected, a motor power circuit 70B for generating power for driving the motor, a control-circuit power circuit 70C for generating power for a control circuit, and a serial-circuit power circuit 70D for generating power for serial circuits.

Accordingly, the number of revolutions of the fan motor 70E, hence the quantity of air delivered by the fan apparatus, can be controlled at will by changing the DC voltage supplied to the drive circuit 70A from the motor power circuit 70B by a microcomputer 72C. In this embodiment, the voltage is controlled to have for example 256 steps within the range between 12 V and 36 V.

On the control board 72, there are provided a serial circuit 72A connected to the serial-circuit power circuit 70D, a drive circuit 72B for driving the motor, and the microcomputer 72C as a control circuit. The drive circuit 72B is connected with a stepping motor for up and down flap 74A for moving the flaps up and down, stepping motors for left and right flaps 74B and 74C, and a floor-sensor stepping motor for floor sensor 74D for turning the direction of the floor sensor for detecting the temperature on the floor surface. The angles of these stepping motors are controlled by signals supplied from the microcomputer 72C.

The microcomputer 72C is connected with an LED display for displaying the operational modes of the system and the like and a receiving circuit for receiving control signals from a remoter controller, both being provided on a display board 76. The microcomputer is also connected with the floor sensor for detecting the temperature on the floor surface and an optical sensor, which are both provided on a sensor board 78. The microcomputer 72C is further connected with a room temperature sensor 80A and a heat exchanger temperature sensor 80B for detecting the temperature of the indoor heat exchanger 16. Still, further, the microcomputer is connected with a self-diagnostic LED, an operation changeover switch for switching the operational mode between normal operation and test operation, and a self-diagnostic switch, which are provided on a switch board 82.

Figure 3:
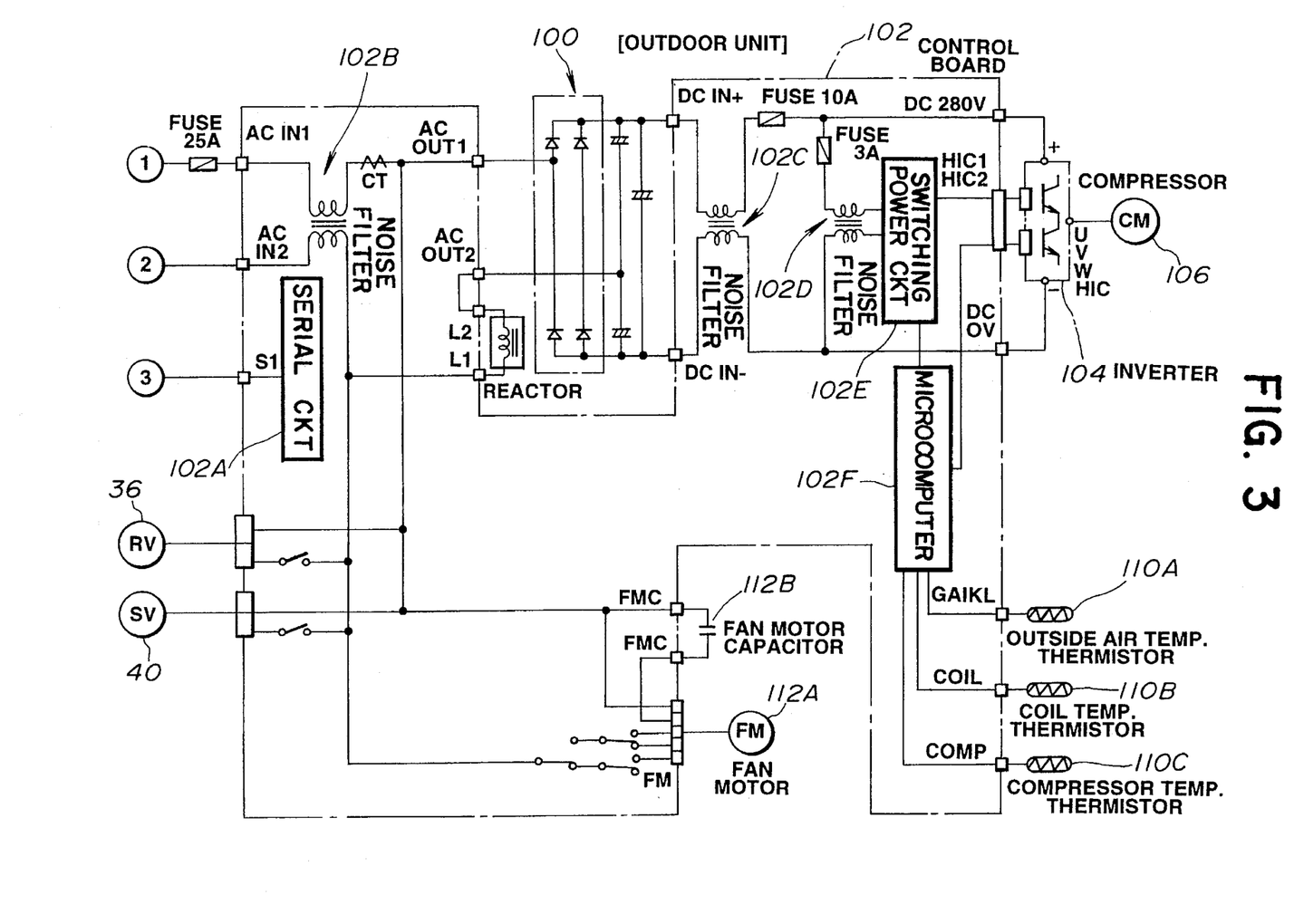
FIG. 3 is an electric circuit diagram of the outdoor unit of the air conditioner.

FIG. 3 is a diagram showing an electric circuit for the outdoor unit 12. The electric circuit has a rectifying circuit 100 and a control board 102. The electric circuit of the outdoor unit 12 is joined with the electric circuit of the indoor unit 10 of FIG. 2 through a plurality of terminals indicated by ①-③.

On the control board 102, there are provided a serial circuit 102A connected to the serial-circuit power circuit 70D of the indoor unit 10, noise filters 102B, 102C, and 102D for eliminating noise, a switching power circuit 102E for generating power for switching an inverter 104, and a microcomputer 102F as the control circuit. The microcomputer 102F controls the frequency (18 Hz–150 Hz) of AC power supplied to the compressor and operations of various units in accordance with control signals transmitted from the microcomputer 72C of the indoor unit 10 through the serial circuit 72A in the indoor unit 10 and the serial circuit 102A.

The switching power circuit 102E is connected to the inverter 104 and the inverter 104 is connected to a compressor 106 for compressing the refrigerant.

The microcomputer 102F is connected with an outside air temperature thermistor 110A as an outside air temperature sensor for detecting the outside air temperature, a coil temperature thermistor 110B for detecting the temperature of the outdoor heat exchanger 28, and a compressor temperature thermistor 110C for detecting the temperature of the compressor. To the outdoor unit 12 are connected the four-way valve 36 and the electromagnetic valve 40. Reference numeral 112A denotes a fan motor and 112B denotes a fan-motor capacitor.

With the air conditioner of FIG. 1, when the four-way valve 36 is switched, with the electromagnetic valve 40 turned off (closed), so that the refrigerant circulates through the indoor heat exchanger 16, refrigerant pipe 18, valve 20, muffler 22, four-way valve 36, accumulator 24, compressor 26, muffler 38, four-way valve 36, outdoor heat exchanger 28, capillary tube 30, strainer 42, valve 32, refrigerant pipe 34, and the indoor heat exchanger 16 in the order named, the refrigerant is evaporated in the indoor heat exchanger 16 and the refrigerant is condensed in the outdoor heat exchanger 28 and, hence, cooling of the space inside the room is achieved. When the refrigerant is circulated in the direction opposite to the above, the refrigerant is condensed in the indoor heat exchanger 16 and the refrigerant is evaporated in the outdoor heat exchanger 28 and, hence, heating of the space inside the room can be achieved.

Further, by opening the electromagnetic valve 40 during the heating operation so that a portion of the refrigerant, which is at a high temperature and is discharged from the compressor 26, flows into the outdoor heat exchanger 28. As a result the temperature of the outdoor heat exchanger 28 is raised and thereby the formation of frost therein is made difficult.

Referring now to FIG. 4 through FIG. 8, an air-conditioning control routine executed by the microcomputer 72C in the indoor unit of the present embodiment will be described.

Figure 4:
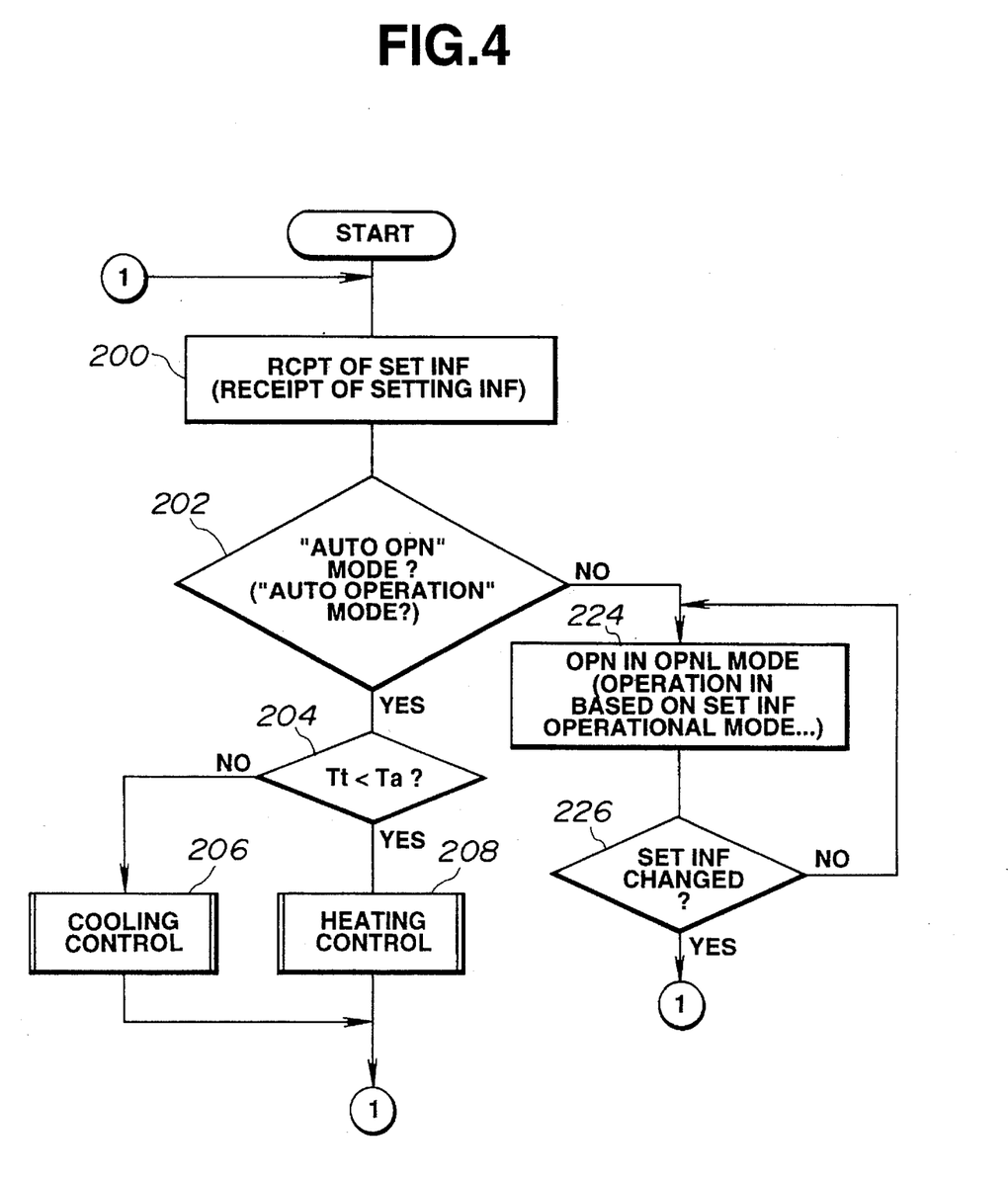
FIG. 4 is a flowchart showing a control routine.

The control routine shown in the flowchart of FIG. 4 starts when a remote controller, not shown, or a switch, not shown, provided in the air conditioner has issued instructions to start the operation.

In step 200, pieces of setting information such as the operational mode, target temperature, wind direction of the fan, air quantity of the fan, and so on are received. In a ROM, not shown, incorporated in the microcomputer 72C, there is stored default setting information in advance, and when some item of setting information has not been changed with the remote controller or the like, the default setting information for that item is adopted.

In following step 202, it is determined whether the operational mode in the setting information calls for automatic operation. When the result of the determination is positive, step 204 follows, and when it is negative, namely, when the operational mode is another mode, such as the cooling, heating, or drying mode, step 224 follows.

In step 224, the operation is performed in the pertinent operational mode in accordance with the setting information. Since details of such operation are like those of conventional air conditioners and are not directly associated with the present invention, description of the same will be omitted here. The operation in step 224 is continued unless it is decided in the following step 226 that the setting information has been changed by the remote controller or the like during the operation. When the result of the determination in step 226 is positive, the steps of the procedure from above step 200 are executed again.

On the other hand, when the setting of the operational mode is for automatic operation and, hence, the decision in step 202 is positive, then, in step 204, the target temperature Ta received in step 200 is compared with the room temperature Tt.

Figure 5:
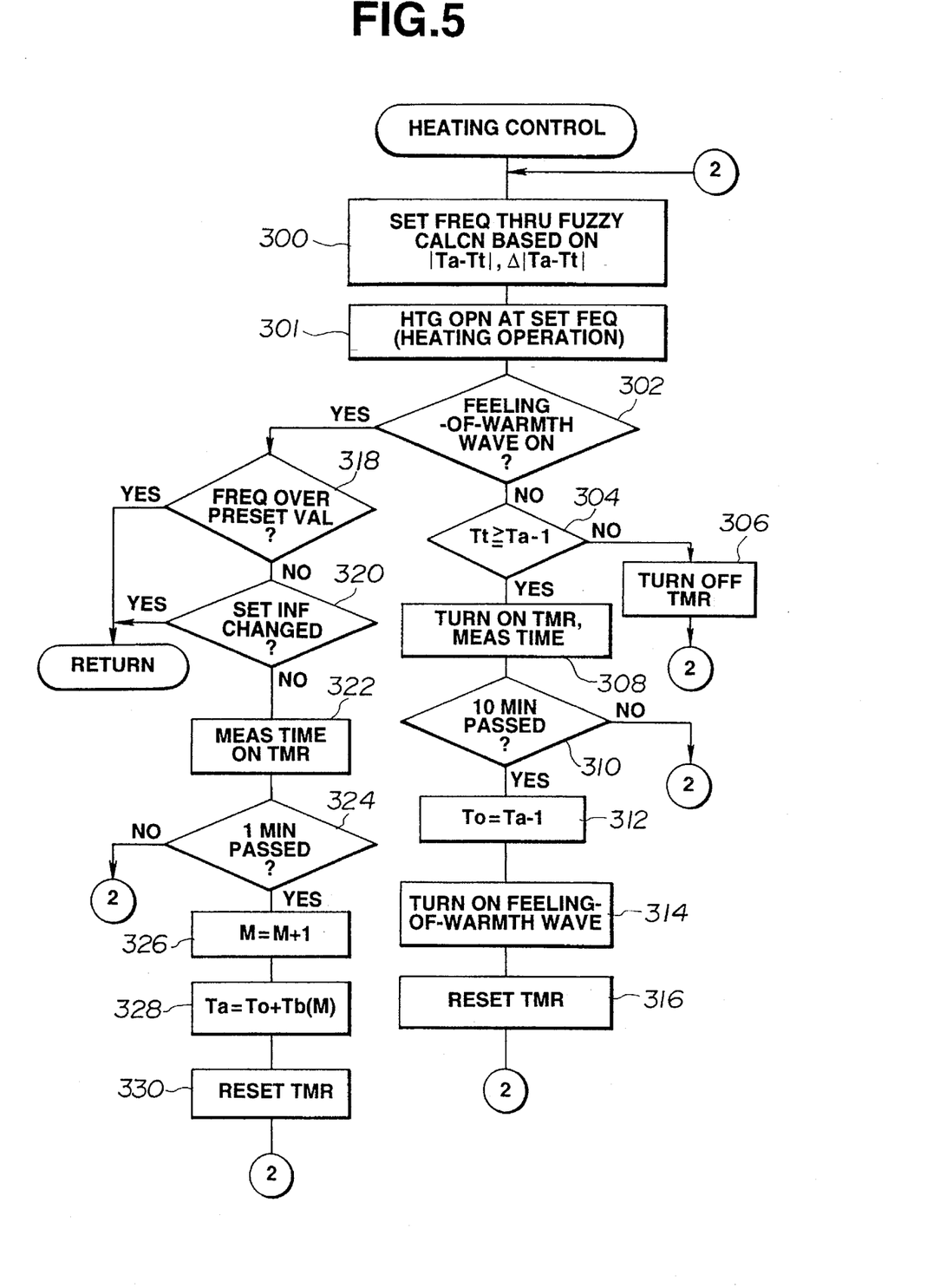
FIG. 5 is a flowchart showing a subroutine for heating control.
Figure 6:
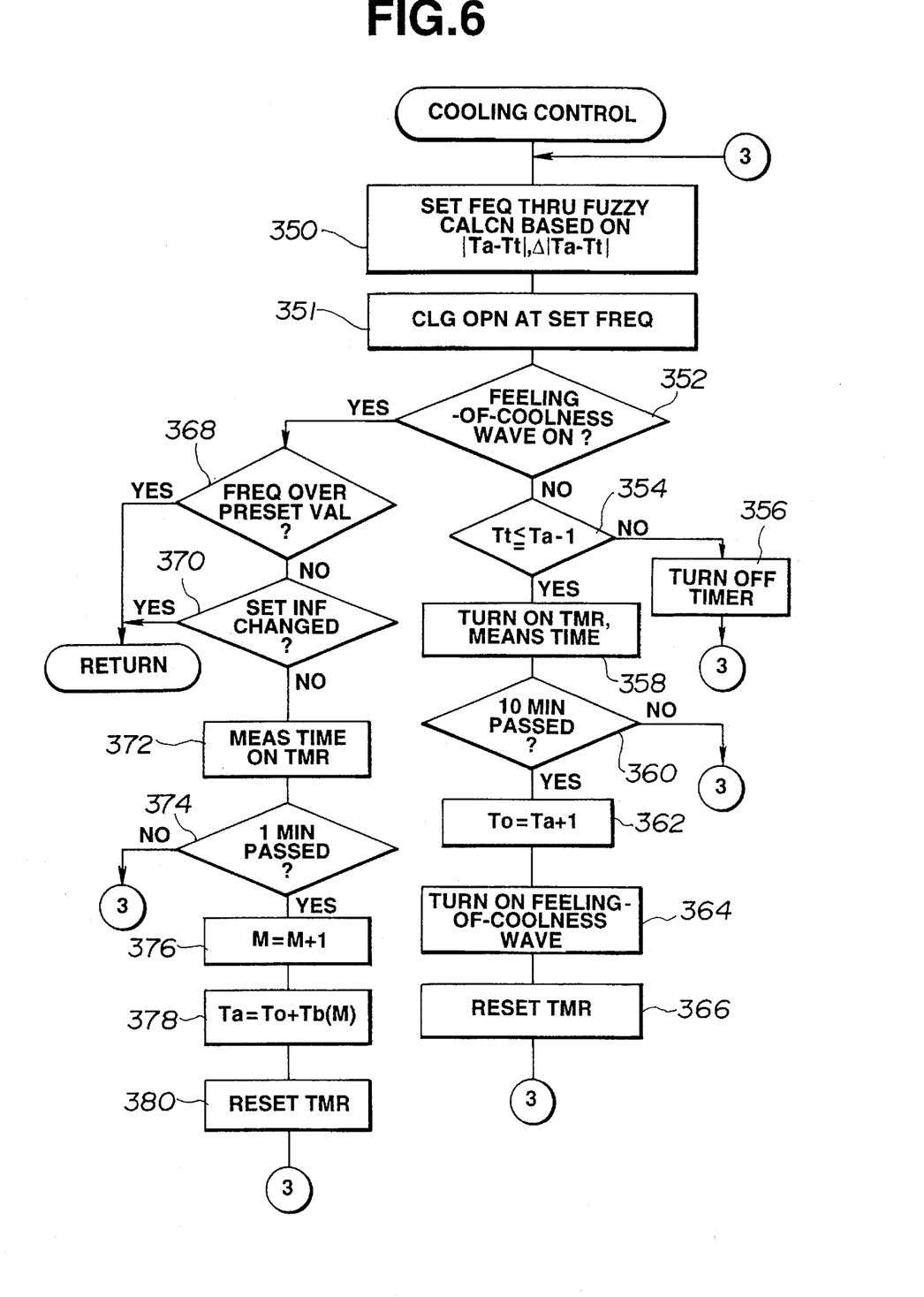
FIG. 6 is a flowchart showing a subroutine for cooling control.

When the target temperature Ta is higher than the room temperature Tt, namely, when the person in the room desires to heat the room, then, the decision in step 204 is positive and step 208 follows. In step 208 the subroutine for heating control shown in FIG. 5 is executed. However, when the target temperature Ta is lower than the room temperature Tt, namely, when the person in the room desires to cool the room, then, the decision in step 204 is negative and step 206 follows. In step 206 the subroutine for cooling control shown in FIG. 6 is executed.

Now, the subroutine for heating control shown in FIG. 5 will be described using a graph shown in FIG. 7, which shows an example of changes in the room temperature during heating control operation.

In step 300, the operating frequency of the compressor is set through a fuzzy calculation based on |Ta−Tt| and Δ|Ta−Tt| (variation from a preceding value of |Ta−Tt|). The setting of the frequency made here will be described below.

The microcomputer 72C of the indoor unit 10 makes a fuzzy calculation based on the temperature difference between the target temperature, and the room temperature and the variation of the temperature difference, and thereby obtains the variation of the operating capacity (frequency) of the compressor 26. It then transmits the variation of the operating capacity to the microcomputer 102F in the outdoor unit 12 over the interface circuit and signal line. The microcomputer 102F in the outdoor unit 12, in turn, supplies the compressor 26 with AC power at a new frequency obtained by adding the above variation of the frequency to the frequency of the AC power which is currently supplied to the compressor 26.

By increasing or decreasing the frequency of the AC power supplied to the compressor 26 on the basis of the target temperature and room temperature, the operating capacity (frequency of the AC power) of the compressor 26 necessary for attaining the target temperature can be obtained and the operation of the compressor 26 is maintained at that operating capacity. When the target temperature has been changed under the above operating conditions, the variation of the operating capacity of the compressor 26 is calculated anew by the microcomputer 72C and, thus, the operating capacity (frequency) necessary for attaining the target temperature (air conditioning load) is set.

Then, in step 301, a heating operation is performed at the frequency set as described above. Through the heating operation, the room temperature rises during the period from time 0 to time $t_1$ shown in FIG. 7.

In following step 302, it is determined whether a flag is turned on indicating that a feeling-of-warmth wave, i.e., control to periodically change the room temperature by correcting the target temperature to rise and fall periodically in the temperature control according to the invention, is being executed.

When the decision in step 302 is positive, step 318 follows, but when it is negative, step 304 follows.

Since the flag is not turned on at first, step 304 follows, and therein it is determined whether the room temperature Tt has become equal to or higher than the target temperature Ta−1° C.

Since the room temperature Tt, immediately after the start of the feeling-of-warmth wave (time 0~time $t_1$ in FIG. 7), does not become equal to or higher than the target temperature Ta−1° C., the decision in 304 is negative. Then, step 306 follows and therein a timer, not shown, controlled by the microcomputer 72C is turned off. Incidentally, the timer is off in the default state. Then the flow of the procedure returns to step 300 and the steps of the procedure are executed again from this step.

Figure 7:
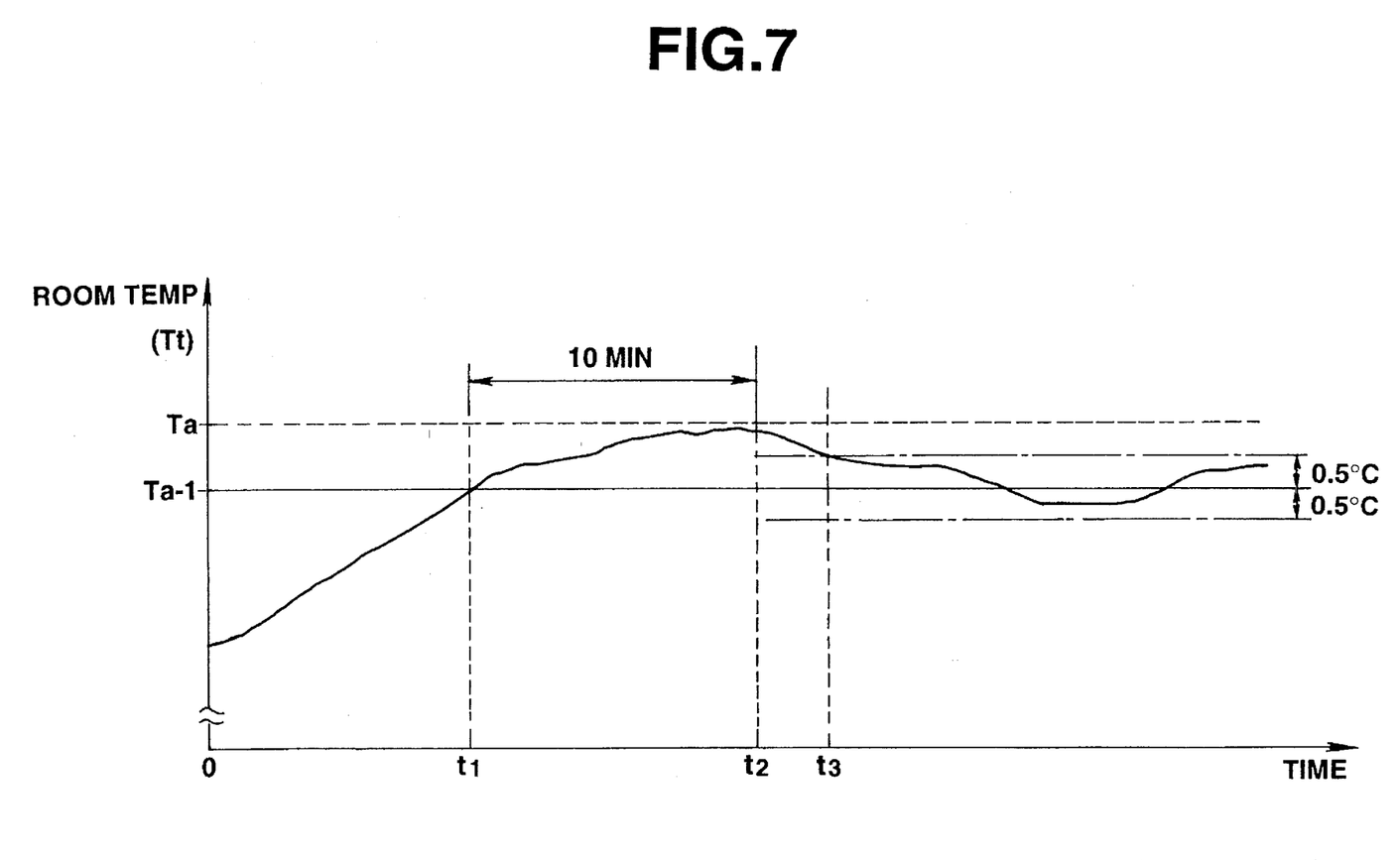
FIG. 7 is a chart showing variations of the room temperature.

On the other hand, when the point in time $t_1$ in FIG. 7 has been reached or exceeded and the room temperature Tt has become equal to or higher than the target temperature Ta−1° C., the decision in step 304 becomes positive and step 308 follows. In step 308, the timer is turned on (started) and a time measurement is made. If the timer has already been turned on, the timer is not reset but only the time measurement is made.

In following step 310, it is determined whether the timer has counted 10 minutes or more as the result of the time measurement in step 308.

Since the room temperature Tt between the points of time $t_1$ and $t_2$ in FIG. 7 is higher than the target temperature Ta−1° C., the decision in step 304 becomes positive and step 308 follows. However, since the period of time of 10 minutes has not yet been passed, since the timer has been turned on in step 308, the decision in step 310 becomes negative. Hence, the flow of the procedure returns to step 300 and the steps of the procedure are executed again from this step.

When the point of time $t_2$ has been reached, the timer count exceeds 10 minutes. Therefore, the decision in step 310 becomes positive and step 312 follows, and therein Ta−1° C. is set as the target temperature for the first time $T_0$.

In following step 314, information on the operating condition indicating the fact that the feeling-of-warmth wave, which will be described later in detail, is started. Namely, the feeling-of-warmth wave is turned on or, is set. In following step 316, a timer for measuring the time elapsed after the start of the feeling-of-warmth wave is reset and then the flow of the procedure returns to step 300, and the steps of the procedure are executed again from this step.

After steps 300 and 301 have been executed again, a positive decision is made in step 302, i.e., it is determined that the feeling-of-warmth wave has been turned on and step 318 follows.

In step 318, it is determined whether the operating frequency of the compressor is over a predetermined frequency, and in following step 320 it is determined whether the setting information has been changed by the remote controller or the like. If the decision in either of steps 318 and 320 is positive, the subroutine is terminated and returns to the main routine.

When the decision in each of step 318 and step 320 is negative, step 322 follows and therein the time is measured on the timer. In following step 324, it is determined whether the timer has counted more than one minute as the result of the time measurement on the timer in step 322.

At first the time elapsed after the timer was started in step 316, i.e., the time elapsed after the feeling-of-warmth wave was started in step 314, is measured in step 322. It is then determined in step 324 whether the time elapsed is over one minute.

When one minute has not elapsed, a negative decision is made in step 324 and the flow of the procedure returns to step 300 and the steps of the procedure are executed again from this step.

When one minute has elapsed, a positive decision is made and step 326 follows. In step 326, a variable M for calculating the fluctuation amount, described later, is increased in increments of 1.

The variable M is initialized at first to the initial value 0 and it is increased in increments of 1 in this step. When the value becomes 121, the value is set to 1 by an interrupt routine, not shown. Accordingly, the variable M, of which the initial value is 0, repeatedly takes up integers 1~120.

In following step 328, a new target temperature Ta is set in accordance with the following expressions (1) and (2).

$$Ta = T_0 + Tb(M) \quad (1)$$

$$Tb(M) = 0.5 \times K_M \quad (2)$$

The temperature $T_0$ in expression (1) is the above described target temperature $T_0$ set for the first time, i.e., the temperature lower than the target temperature Ta set at the beginning by 1° C.

Figure 8:
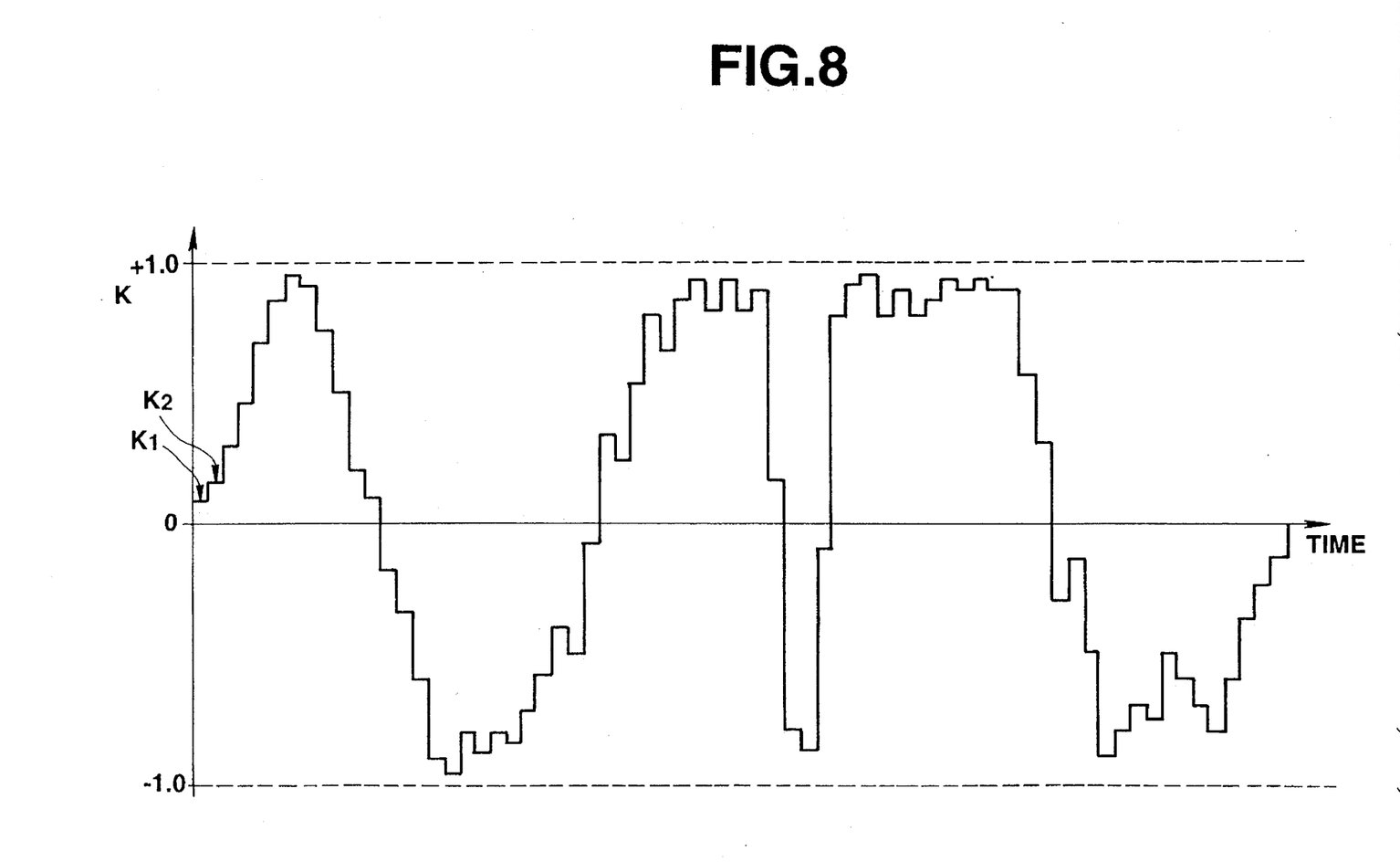
FIG. 8 is a chart showing variations of a constant used for calculating the target temperature provides temperature fluctuations.

Further, $K_M$ in expression (2) represents a previously stored variable K and the value of the variable K is set so as to vary within the range between the maximum value +1.0 and the minimum value −1.0 at intervals of one minute as shown in FIG. 8.

At first, the value of $K_1$ shown in FIG. 8 is read and a new target temperature Ta is set.

Then, in following step 330, the timer is reset to measure the time elapsed after the setting of the new target temperature Ta.

Then, the flow of the procedure returns to step 300 and the steps of the procedure are executed again from this step.

For the second time and forward after the setting of the feeling-of-warmth wave, a positive decision will be made in step 302 and a negative decision will be made in each of steps 318 and 320, except for the case where the setting information is changed during the operation by the remote controller or the like, or the case where the operating frequency of the compressor is over the predetermined value (namely, when the load on the air conditioner is increased), and steps 322 and 324 will be repeatedly executed until one minute elapses after the timer was reset in step 330 as described above.

When one minute has elapsed, a positive decision is made in step 324 and, in the following steps 326 and 328, the value of the variable K for the one minute period next to that for which the variable K was read on the previous occasion, i.e., the value of $K_2$ in FIG. 8, is read and, then a new target temperature Ta is set based on this value according to the above expressions (1) and (2). In the following step 330, the timer is reset again.

By repeatedly executing steps 300, 302, 318, 320, 322, 324, 326, 328, and 330 as described above, room temperature control is achieved with the temperatures 0.5° C. above and below the temperature. The temperature is lowered by 1° C. than the target temperature Ta at the beginning and varies between upper and lower limits for the maximum width of fluctuation, as apparent from expressions (1) and (2). The result is that the feeling-of-warmth wave is created.

Thus, the room temperature varies with the temperatures 0.5° C. above and below the temperature, which is 1° C. lower than the target temperature Ta at the beginning, and extends between the upper and lower limits of the maximum width of fluctuation as shown in FIG. 7. The reason why the temperature 1° C. lower than the target temperature Ta is taken as the center of the varying width is because it is known from experimental data that the comfortable feeling of human beings is maintained even when the average room temperature is 1° C. lower than the desired temperature (target temperature), virtually unchanged from the comfortable feeling obtained at the desired temperature (target temperature) by giving fluctuations to the temperature.

The heating control routine is forcedly terminated when instructions to stop the operation are issued by a remote controller, not shown, or a switch, not shown, provided in the air conditioner.

Now, a cooling control subroutine shown in FIG. 6 will be described.

In step 350, the same as in above step 300, the operating frequency of the compressor is set through fuzzy logic calculations based on |Ta−Tt| and Δ|Ta−Tt| (i.e., variations from a preceding |Ta−Tt|).

In following step 351, a cooling operation is performed at the frequency set in step 350.

In following step 352, it is determined whether a flag has been turned on indicating that a feeling-of-coolness wave is being executed, i.e., whether the control executed in the cooling control, corresponding to the above-described feeling-of-warmth wave in the heating control (the control to change the room temperature periodically by correcting the target temperature to rise and fall periodically), is being executed.

When the decision in step 352 is positive, step 368 follows, and when it is negative, step 354 follows.

Since the flag is not turned on at first, step 354 follows, and therein it is determined whether the room temperature Tt has become equal to or lower than the target temperature Ta+1° C.

When the decision in step 354 is negative, step 356 follows and therein the timer is turned off. Then, the flow of the procedure returns to step 350 and the steps of the procedure are executed again from this step.

When the decision in step 354 is positive, step 358 follows. In step 358, the timer is turned on (started) and a time measurement is made. If the timer has already been turned on, the timer is not reset but only the time measurement is made.

In the following step 360, it is determined whether the timer has counted more than 10 minutes as the result of the time measurement in step 358.

When the decision in step 360 is negative, the flow of the procedure returns to step 350 and the steps of the procedure are executed again from this step.

When the decision in step 360 is positive, step 362 follows and therein Ta+1° C. is set as the target temperature for the first time $T_0$. In following step 364, information is created on the operating condition as to the feeling-of-coolness wave, which will be described later in detail, namely the indication is set that feeling-of-coolness wave has been turned on. In the following step 366, the timer for measuring the time elapsed after the start of the feeling-of-coolness wave, is reset. Then the flow of the procedure returns to step 350 and the steps of the procedure are executed again from this step.

After steps 350 and 351 have been executed again, a positive decision will be made in step 352, i.e., it will decided therein that the feeling-of-coolness wave is turned on, and, then, step 368 follows.

In step 368, it is determined, the same as in step 318, whether the operating frequency of the compressor is over a predetermined frequency. In following step 370, it is determined, the same as in step 320, whether the setting information has been changed by the remote controller or the like. If the decision in any of steps 368 and 370 is positive, the subroutine is terminated and the procedure returns to the main routine.

When the decision in each of step 368 and step 370 is negative, step 372 follows and therein the time is measured on the timer. In the following step 374, it is determined whether the timer has counted more than one minute as a result of the time measurement on the timer in step 372.

When one minute has not elapsed, a negative decision is made in step 374 and, then the flow of the procedure returns to step 350 and the steps of procedure are executed again from this step.

When one minute has elapsed, a positive decision is made in step 374, and, then, steps 376, 378, and 380, similar to steps 326, 328, and 330 in the above described heating control, are executed. Namely, in step 376, the variable M for calculating the fluctuation amount is increased in increments of 1, and in following step 378, a new target temperature Ta is set in accordance with the following expressions (3) and (4).

$$Ta = T_0 + Tb(M) \quad (3)$$

$$Tb(M) = 0.5 \times K_M \quad (4)$$

The temperature $T_0$ in expression (3) is the above described target temperature $T_0$ set for the first time, i.e., the temperature higher than the target temperature Ta set at the beginning by 1° C.

In following step 380, the timer is reset to measure the time elapsed after the setting of the new target temperature Ta and, then the flow of the procedure returns to step 350 and the steps of the procedure are executed again from this step.

For the second time and subsequently after the setting of the feeling-of-coolness wave, a positive decision will be made in step 352 and a negative decision made in each of steps 368 and 370, except for the case where the setting information is changed during the operation by the remote controller or the like, or in the case where the operating frequency of the compressor is over the predetermined value (namely, when the load on the air conditioner is increased), and steps 372 and 374 will be repeatedly executed until one minute elapses after the timer was reset in step 380, as described above.

When one minute has elapsed, a positive decision is made in step 374 and, in the following steps 376 and 378, the value of the variable K for the one minute period next to that for which the variable was read on the previous occasion, i.e., the value of $K_2$ in FIG. 8, is read and then a new target temperature Ta is set based on this value according to the above expressions (3) and (4). In the following step 380, the timer is reset again.

By repeatedly executing steps 350, 352, 368, 370, 372, 374, 376, 378, and 380 as described above, room temperature control with the temperatures 0.5° C. above and below a temperature that is at the beginning higher than the target temperature Ta by 1° C. and is within the upper and lower limits of the maximum width of fluctuation, as apparent from expressions (3) and (4) mentioned above, i.e., feeling-of-coolness wave is created.

Thus, the room temperature varies with the temperatures 0.5° C. above and below the temperature, which is 1° C. higher than the target temperature Ta at the beginning, taken as the upper and lower limits of the maximum width of fluctuation.

The cooling control routine is forceably terminated when instructions to stop the operation are issued by a remote controller, not shown, or a switch, not shown, provided on the air conditioner.

According to the embodiment, as apparent from the above description, comfortable feelings can be provided by bringing the room temperature to the vicinity of a desired temperature (target temperature) until the room temperature is stabilized around the target temperature, i.e., the human senses become accustomed to the environment. Further, even after the room temperature has been stabilized around the target temperature, i.e., the human sense has become accustomed to the environment and the comfortable feeling has begun to lessen, the environment can be changed and the comfortable feeling can be maintained by varying the room temperature. In this case, finer control of the room temperature can be executed for maintaining the comfortable feeding according to changes in the human senses.

Further, since the target temperature is shifted to the side at which the load of the air conditioner is lightened in both cases of heating control and cooling control, the load on the air conditioner can be reduced as compared with that in the conventional practice in which the room temperature was controlled to become equal to the target temperature set at the beginning. Hence, energy saving can be achieved. According to the results of experiments, the practice of setting values in the present embodiment provides an energy saving effect of approximately 7%.

Although, in the embodiment, it is adapted such that the constant K whose value varies with the passage of time as shown in FIG. 8 is stored in memory at the beginning and the stored data is read over the course of time, temperature control data may be obtained by calculating, over the course of time, temperature fluctuation data taking on an 1/f power spectrum on the basis of the following chaos calculating expression (5). The fluctuation taking on the 1/f power spectrum, the so-called 1/f fluctuation, is said to represent the changes in the human pulse, as an example, and to provide special comfortable feeling to a human being. Therefore, if the temperature fluctuation is realized by such means, a special comfortable feeling can be obtained.

$$Xn+1 = (Xn + Xn^{1.5}) MOD 1 \quad (5)$$

(Initial value: $X_0 = 0.2$)

Further, in addition to the practice of varying the room temperature (providing it with fluctuations) as in the above embodiment, if the wind quantity of the fan is also controlled to exhibit variations (fluctuations) the same as in the temperature variations in the embodiment or to exhibit the 1/f fluctuations as described above, a more special comfortable feeling can be provided.

Although the example of an air conditioner equipped with both a cooling function and a heating function has been described in the above embodiment, the invention can be applied to the air conditioner whether it is equipped with only a cooling function or is equipped with only a heating function.

According to the invention, as described above in detail, the target temperature is corrected to rise and fall periodically in accordance with a predetermined rule and, further, the average of the target temperature after making the correction takes on a value shifted to the side at which the air conditioning load of the air conditioning means becomes lower than when the target temperature has not been corrected. Therefore, the room temperature varies up and down periodically according to the predetermined rule and the average of the room temperature takes on a value shifted in such a direction that the air conditioning load of the air conditioning means is thereby lightened from that for attaining the target temperature before the correction.

Accordingly, an excellent effect can be obtained that energy consumption can be reduced without impairing the comfortable feeling.

In the early stage of operation before the room temperature is stabilized around the target temperature, the human sense is not yet accustomed to the indoor environment, and, hence, the comfortable feeling can be provided by bringing the room temperature to the vicinity of the desired temperature (target temperature). Further, after the room temperature has been at a value within a predetermined temperature range from the target temperature over a predetermined length of time, i.e., after the room temperature has been stabilized around the target temperature, the target temperature changing means causes the average value of the target temperature to shift in such a direction that the air conditioning load of the air conditioning means is thereby lightened from that for attaining the target temperature before the correction, and the air conditioning operation is performed to bring the room temperature to this room temperature, so that the senses of a person in the room are prevented from becoming accustomed to the indoor environment and his or her comfortable feeling is prevented from lessening. Thus, the comfortable feeling of the person in the room can be maintained.

Accordingly, an excellent effect is obtained in that fine room temperature control can be executed to maintain the comfortable feeling corresponding to the change in the senses of the person in the room.

Further, according to the invention, the room temperature is corrected to rise and fall in accordance with the 1/f fluctuation and, further, the average value of the target temperature after the correction takes on a value shifted in such a direction that the air conditioning load of the air conditioning means is thereby lightened from that for attaining the target temperature before the correction. Hence, also the room temperature periodically varies up and down in accordance with the 1/f fluctuation and the average value of the room temperature takes on a value shifted in such a direction that the air conditioning load of the air conditioning means is thereby lightened from that for attaining the target temperature before the correction.

Therefore, an excellent effect is obtained in that energy consumption can be reduced without lessening the comfortable feeling.

Especially in this case, since the room temperature varies up and down in accordance with the 1/f fluctuation, such an excellent effect can also be provided such that a special comfortable feeling is given to the person in the room.

What is claimed is:

1. A device for regulating the temperature in a room comprising:

room temperature detection means for detecting the temperature in the room;

temperature setting means for setting a target temperature;

air conditioning means for performing an air conditioning operation to bring the room temperature detected by said room temperature detection means toward said target temperature; and target temperature changing means for correcting said target temperature to rise and fall periodically in accordance with a predetermined rule after the room temperature has substantially reached said target temperature by operation of said air conditioning means and shifting the average value of said target temperature after the correction has been made in such a direction that the air conditioning load on said air conditioning means is reduced from that for attaining said target temperature before the correction.

2. A device according to claim 1, wherein said target temperature changing means starts said correction of the target temperature when the period of time during which the room temperature stays within a predetermined temperature range including the target temperature is about to exceed a predetermined length of time.

3. An air conditioner having a refrigerating cycle using a compressor, an outdoor heat exchanger, an expansion device, and an indoor heat exchanger, comprising:

room temperature detection means for detecting the temperature of an air-conditioned room;

temperature setting means for setting a target temperature;

air conditioning means for performing an air conditioning operation to bring the room temperature detected by said room temperature detection means toward said target temperature; and target temperature changing means for correcting said target temperature to rise and fall periodically in accordance with a 1/f fluctuation when a predetermined length of time has elapsed after the room temperature has at least substantially reached said target temperature and shifting the average value of said target temperature after the correction in such a direction that the air conditioning load on said air conditioning means is reduced from that for attaining said target temperature before the correction.

4. A device according to claim 1, wherein said air conditioning means has a refrigerating cycle using a compressor, an outdoor heat exchanger, an expansion device, and an indoor heat exchanger and performs at least one of heating and cooling the room.

5. A device according to claim 1, wherein said air conditioning means heats the room and the predetermined rule is in accordance with the following expressions $$Ta = T_0 + Tb(M)$$

and $$Tb(M) = 0.5 \times K_m$$

where Ta is a new target temperature, $T_0$ is a set temperature and $K_m$ is a variable which changes incrementally between +1.0 and −1.0.

6. A device according to claim 5 wherein the conditioning means is capable of heating and cooling the room, and the set temperature $T_0$ is equal to the initial target temperature minus 1° C. during heating and is equal to the target temperature plus 1° C. during cooling.

7. A device according to claim 4 wherein the compressor has an operating frequency which is variable to control operation of said air conditioning means and the operating frequency is set through fuzzy logic based on |Ta−Tt| and Δ|Ta−Tt| wherein Ta is the target temperature and Tt is the room temperature.

8. A device according to claim 1, wherein said predetermined rule is a 1/f fluctuation.

9. A device according to claim 8, wherein the 1/f fluctuation function is $X_{n+1} = (X_n + X_n^{1.5}) \text{MOD} 1$ (initial value: $X_0 = 0.2$).

* * * * *